US012712485B2

(12) United States Patent
Peng et al.

(10) Patent No.: US 12,712,485 B2
(45) Date of Patent: Aug. 18, 2026

(54) FLEXIBLE PHOTOVOLTAIC BRACKET AND FLEXIBLE PHOTOVOLTAIC SYSTEM WITH STABLE STRUCTURE

(71) Applicant: ARCTECH SOLAR HOLDING CO., LTD., Kunshan City (CN)

(72) Inventors: Yinghai Peng, Kunshan City (CN); Haijun Liu, Kunshan City (CN); Ying Yang, Kunshan City (CN)

(73) Assignee: ARCHTECH SOLAR HOLDING CO., LTD., Kunshan City (CN)

( * ) Notice: Subject to any disclaimer, the term of this patent is extended or adjusted under 35 U.S.C. 154(b) by 10 days.

(21) Appl. No.: 18/942,770

(22) Filed: Nov. 10, 2024

(65) Prior Publication Data

US 2025/0309819 A1 Oct. 2, 2025

Related U.S. Application Data

(63) Continuation-in-part of application No. PCT/CN2024/106934, filed on Jul. 23, 2024.

(30) Foreign Application Priority Data

Mar. 29, 2024 (CN) ........................ 202420628650.X

(51) Int. Cl.
*H02S 30/10* (2014.01)

(52) U.S. Cl.
CPC .................................... *H02S 30/10* (2014.12)

(58) Field of Classification Search
CPC ........................................................ H02S 30/10
See application file for complete search history.

(56) References Cited

FOREIGN PATENT DOCUMENTS

CN 207603512 U 7/2018
CN 208094485 * 11/2018
CN 109869926 * 6/2019
CN 113445668 A 9/2021
CN 215646660 U 1/2022
CN 11478524 * 7/2022
CN 114785245 A 7/2022
CN 114865995 * 8/2022
CN 218269629 U 1/2023
(Continued)

OTHER PUBLICATIONS

Alibaba, www.alibaba.com/products, downloaded Jan. 7, 2026 (Year: 2026).*

*Primary Examiner* — Jayne L Mershon
(74) *Attorney, Agent, or Firm* — Cheng-Ju Chiang

(57) ABSTRACT

A flexible photovoltaic bracket includes a fixing structure, a rope structure and a support frame. The rope structure includes a first assembly rope, a second assembly rope, a first stabilizing rope and a second stabilizing rope. The support frame includes an assembly rope support rod, a first side support rod, a second side support rod and a stabilizing rope support rod. Two ends of the assembly rope stay are connected to the first assembly rope and the second assembly rope. The first side support rod is connected to the first assembly rope and the first stabilizing rope. The second side support rod is connected to the second assembly rope and the second stabilizing rope. Two ends of the stabilizing rope support rod are connected to the first stabilizing rope and the second stabilizing rope. A flexible photovoltaic system is also disclosed.

17 Claims, 9 Drawing Sheets

(56) References Cited

FOREIGN PATENT DOCUMENTS

| | | | |
|---|---|---|---|
| CN | 115913078 | A | 4/2023 |
| CN | 218829784 | U | 4/2023 |
| CN | 218850695 | U | 4/2023 |
| CN | 218940985 | U | 4/2023 |
| CN | 116054690 | A | 5/2023 |
| CN | 219164468 | U | 6/2023 |
| CN | 116722809 | * | 9/2023 |
| CN | 219834036 | * | 10/2023 |
| CN | 219834036 | U | 10/2023 |
| CN | 117200652 | A | 12/2023 |
| CN | 221380852 | U | 7/2024 |
| CN | 221380853 | U | 7/2024 |
| WO | 2023/019967 | A1 | 2/2023 |
| WO | 2023/211516 | A1 | 11/2023 |
| WO | 2025/200200 | A1 | 10/2025 |

* cited by examiner

FLEXIBLE PHOTOVOLTAIC BRACKET AND FLEXIBLE PHOTOVOLTAIC SYSTEM WITH STABLE STRUCTURE

CROSS-REFERENCE TO RELATED APPLICATIONS

The present disclosure is a bypass continuation-in-part of National Phase conversion of International (PCT) Patent Application No. PCT/CN2024/106934, filed on Jul. 23, 2024, which further claims priority of a Chinese Patent Application No. 202420628650.X, filed on Mar. 29, 2024 and titled "FLEXIBLE PHOTOVOLTAIC BRACKET AND FLEXIBLE PHOTOVOLTAIC SYSTEM WITH STABLE STRUCTURE", the entire content of which is incorporated herein by reference.

TECHNICAL FIELD

This application belongs to the field of photovoltaic technology, and in particular relates to a flexible photovoltaic bracket and a flexible photovoltaic system.

BACKGROUND

At present, the rope supports of flexible photovoltaic brackets on the market are basically triangular supports. When an inclination angle of an assembly rope is large, a center of gravity of the module will be eccentric. After running for a period of time, a middle portion of a rope structure sags. When the rope support is applied to the flexible photovoltaic bracket, the eccentricity of the module's center of gravity causes the eccentric torque of the flexible photovoltaic bracket, resulting in poor stability of the flexible photovoltaic bracket.

Therefore, it is necessary to provide a new flexible photovoltaic bracket and flexible photovoltaic system to solve the above problems.

SUMMARY

An object of the present disclosure is to provide a flexible photovoltaic bracket and a flexible photovoltaic system. When an inclination angle of a plurality of photovoltaic modules installed on a rope structure is too large, the eccentric torque caused by the self-weight of the photovoltaic modules are reduced and the stability of the flexible photovoltaic bracket is improved.

In order to achieve the above object, the present disclosure adopts the following first technical solution: a flexible photovoltaic bracket, including:

- a plurality of fixing structures;
- a rope structure connected between two fixing structures which are disposed at intervals; the rope structure including a first assembly rope, a second assembly rope, a first stabilizing rope and a second stabilizing rope; the first assembly rope and the second assembly rope being located above the first stabilizing rope and the second stabilizing rope;
- a support frame including an assembly rope support rod, a first side support rod, a second side support rod and a stabilizing rope support rod; two ends of the assembly rope support rod being connected to the first assembly rope and the second assembly rope; the first side support rod being connected to the first assembly rope and the first stabilizing rope; the second side support rod being connected to the second assembly rope and the second stabilizing rope; two ends of the stabilizing rope support rod being connected to the first stabilizing rope and the second stabilizing rope; a length of the assembly rope support rod being shorter than a length of the stabilizing rope support rod; the first side support rod and/or the second side support rod extend obliquely to an outside along a top-to-bottom direction.

In order to achieve the above object, the present disclosure adopts the following second technical solution:

- a flexible photovoltaic system, including: the above flexible photovoltaic bracket; the flexible photovoltaic system further including a plurality of photovoltaic modules installed on the flexible photovoltaic bracket; the photovoltaic modules being fixedly connected to the first assembly rope and the second assembly rope.

Compared with the prior art, the beneficial effects of the present disclosure are as follows.

The assembly rope support rod of the flexible photovoltaic bracket of the present disclosure is connected to the first assembly rope and the second assembly rope. The first side support rod is connected to the first assembly rope and the first stabilizing rope. The second side support rod is connected to the second assembly rope and the second stabilizing rope. The stabilizing rope support rod is connected to the first stabilizing rope and the second stabilizing rope. The length of the assembly rope support rod is shorter than the length of the stabilizing rope support rod. The first side support rod and/or the second side support rod extend obliquely to the outside along the top-to-bottom direction. When the assembly ropes installed with the photovoltaic modules assume an inclination angle driven by a rotary drive mechanism, the pre-stressed force of the two stabilizing ropes will support the two assembly ropes and the photovoltaic modules through the first side support rod and/or the second side support rod, which will not easily cause distortion of the module. A lower edge of the photovoltaic modules will not cause arc sagging, thereby improving the wind resistance stability of the structure of the flexible photovoltaic bracket.

DETAILED DESCRIPTION

Figure 1:
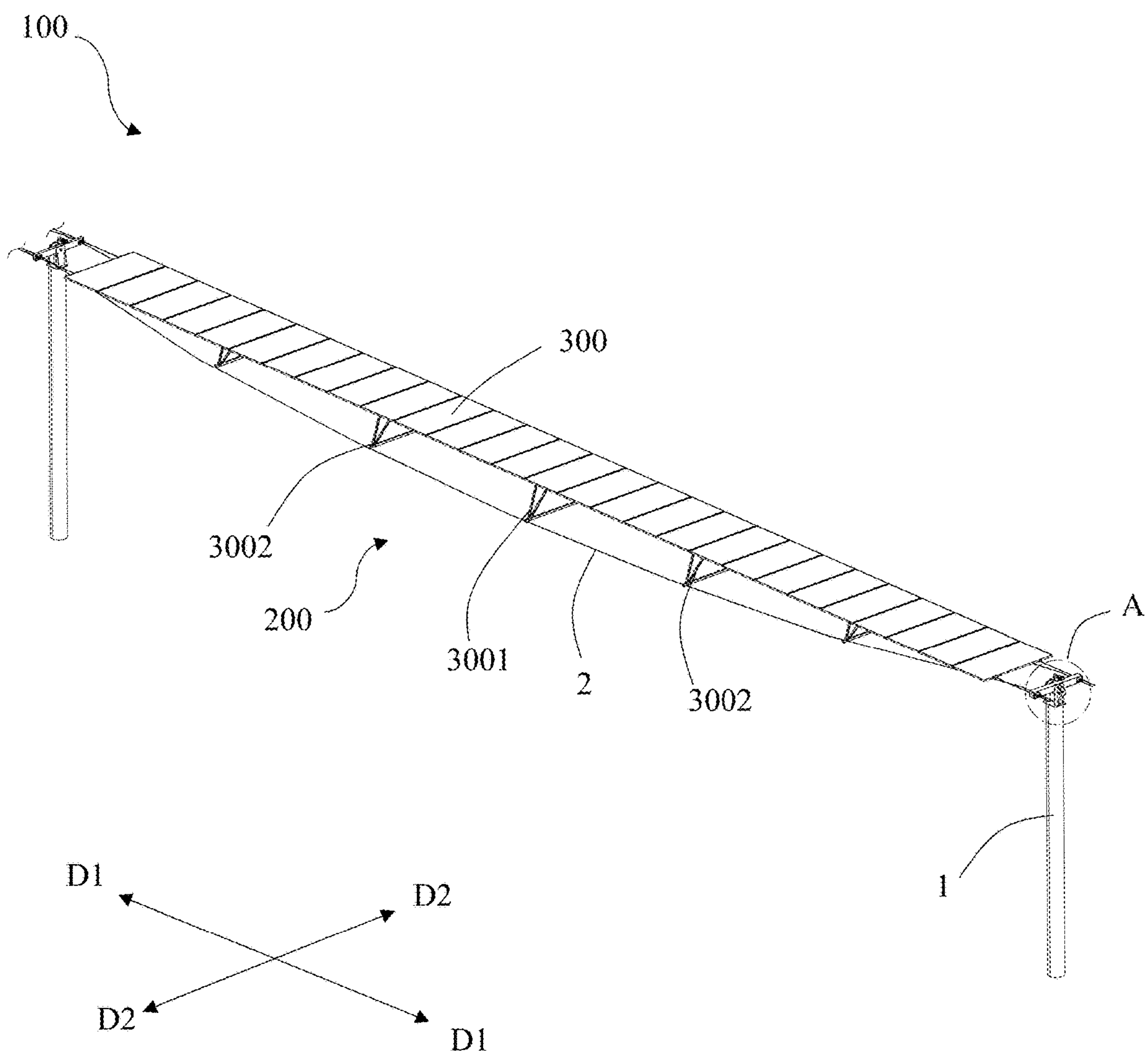
FIG. 1 is a perspective schematic view of a flexible photovoltaic system of the present disclosure.

Exemplary embodiments of the present disclosure will be described in detail below with reference to the accompanying drawings. If there are several specific embodiments, features of these embodiments may be combined with each other provided there is no conflict. When the description refers to the drawings, the same numbers in different drawings refer to the same or similar elements, unless otherwise stated. The following description of exemplary embodiments does not represent all embodiments consistent with the present disclosure. Rather, they are merely examples of devices, products and/or methods consistent with aspects of the present disclosure as recited in the claims of the present disclosure.

The terminologies used in the present disclosure are only for the purpose of describing specific embodiments, and are not intended to limit the protection scope of the present disclosure. The singular forms “a”, “said”, and “the” used in the specification and claims of the present disclosure are also intended to include plural forms unless the context clearly indicates other meanings.

It should be understood that the terms “first”, “second” and similar words used in the specification and claims of the present disclosure do not represent any order, quantity or importance, but are only used to distinguish different components. Similarly, “an” or “a” and other similar words do not mean a quantity limit, but mean that there is at least one. Unless otherwise noted, “front”, “rear”, “top”, “bottom” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Referring to FIG. 1 to FIG. 9, the present disclosure discloses a flexible photovoltaic system 100. The flexible photovoltaic system 100 includes a flexible photovoltaic bracket 200 and a plurality of photovoltaic modules 300 installed on the flexible photovoltaic bracket 200. The flexible photovoltaic bracket 200 includes a plurality of fixing structures 1, a rope structure 2 and a plurality of support frames 3. The rope structure 2 is connected between two fixing structures 1 which are disposed at intervals. The rope structure 2 includes a first assembly rope 21, a second assembly rope 22, a first stabilizing rope 23 and a second stabilizing rope 24. The first assembly rope 21 and the second assembly rope 22 are located above the first stabilizing rope 23 and the second stabilizing rope 24. The support frame 3 includes an assembly rope support rod 31, a first side support rod 32, a second side support rod 33 and a stabilizing rope support rod 34. The assembly rope support rod 31, the first side support rod 32, the second side support rod 33 and the stabilizing rope support rod 34 are arranged in a same plane. Of course, the assembly rope support rod 31, the first side support rod 32, the second side support rod 33 and the stabilizing rope support rod 34 may not be coplanar. Two ends of the assembly rope support rod 31 are connected to the first assembly rope 21 and the second assembly rope 22. The first side support rod 32 is connected to the first assembly rope 21 and the first stabilizing rope 23. The second side support rod 33 is connected to the second assembly rope 22 and the second stabilizing rope 24. Two ends of the stabilizing rope support rod 34 are connected to the first stabilizing rope 23 and the second stabilizing rope 24. A length of the assembly rope support rod 31 is shorter than a length of the stabilizing rope support rod 34. The first side support rod 32 and/or the second side support rod 33 extend obliquely to an outside along a top-to-bottom direction. The outside mentioned herein refers to an outside along an extension direction of the assembly rope support rod 31, that is, a width direction D2-D2 of the rope structure 2. The width direction D2-D2 of the rope structure 2 and a length direction D1-D1 of the rope structure 2 are perpendicular to each other. The support frame 3 is symmetrical with respect to a center vertical line of the assembly rope support rod 31. The first side support rod 32 and the second side support rod 33 are symmetrical relative to the center vertical line of the assembly rope support rod 31. Such an arrangement allows the support frame 3 to assume a trapezoidal structure. By fixing the flexible photovoltaic bracket 200 to the first assembly rope 21 and the second assembly rope 22, the assembly rope support rod 31 of the support frame 3 is in contact with a back of the photovoltaic modules 300, thereby reducing the eccentric torque caused by the self-weight of the photovoltaic modules 300, and improving the distortion and deformation of the plane of the photovoltaic modules 300.

Figure 2:
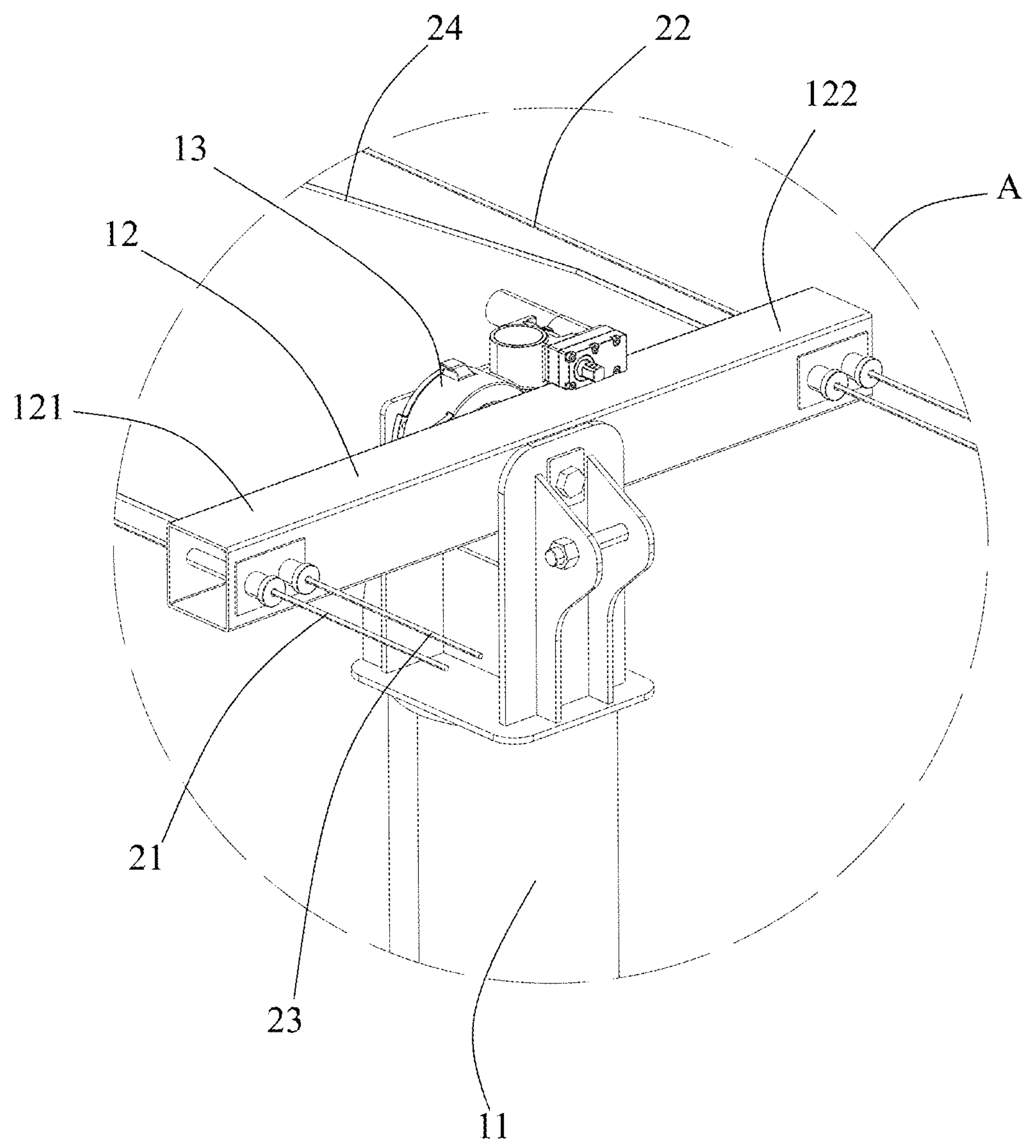
FIG. 2 is a partially enlarged schematic view of part A in FIG. 1.

Referring to FIG. 1 and FIG. 2, in the present embodiment, the fixing structure 1 includes a plurality of upright columns 11, a plurality of cross beams 12 and a plurality of rotary driving mechanisms 13. The cross beam 12 is rotatably installed on a top of the upright column 11. The rotary driving mechanism 13 drives the cross beam 12 to rotate on the top of the upright column 11. The cross beam 12 includes a first end 121 and a second end 122 which are oppositely arranged along the width direction D2-D2. The first assembly rope 21 and the first stabilizing rope 23 pass through the first end 121. The second assembly rope 22 and the second stabilizing rope 24 pass through the second end 122. When the cross beam 12 rotates, the photovoltaic modules 300 are driven to rotate synchronously through the first assembly rope 21, the first stabilizing rope 23, the second assembly rope 22 and the second stabilizing rope 24.

Figure 3:
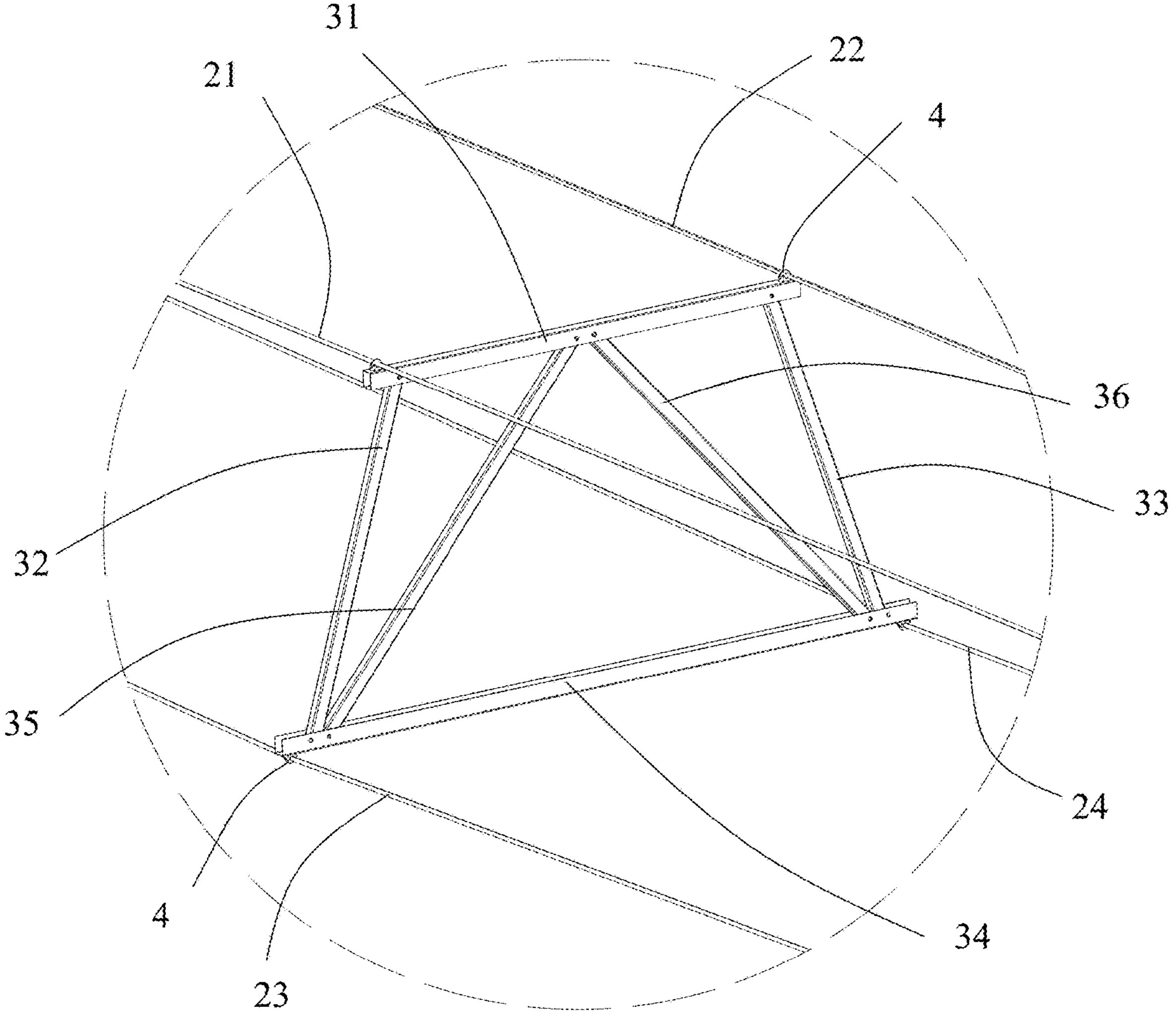
FIG. 3 is a partially enlarged schematic view of a support frame and a rope structure of the present disclosure.
Figure 4:
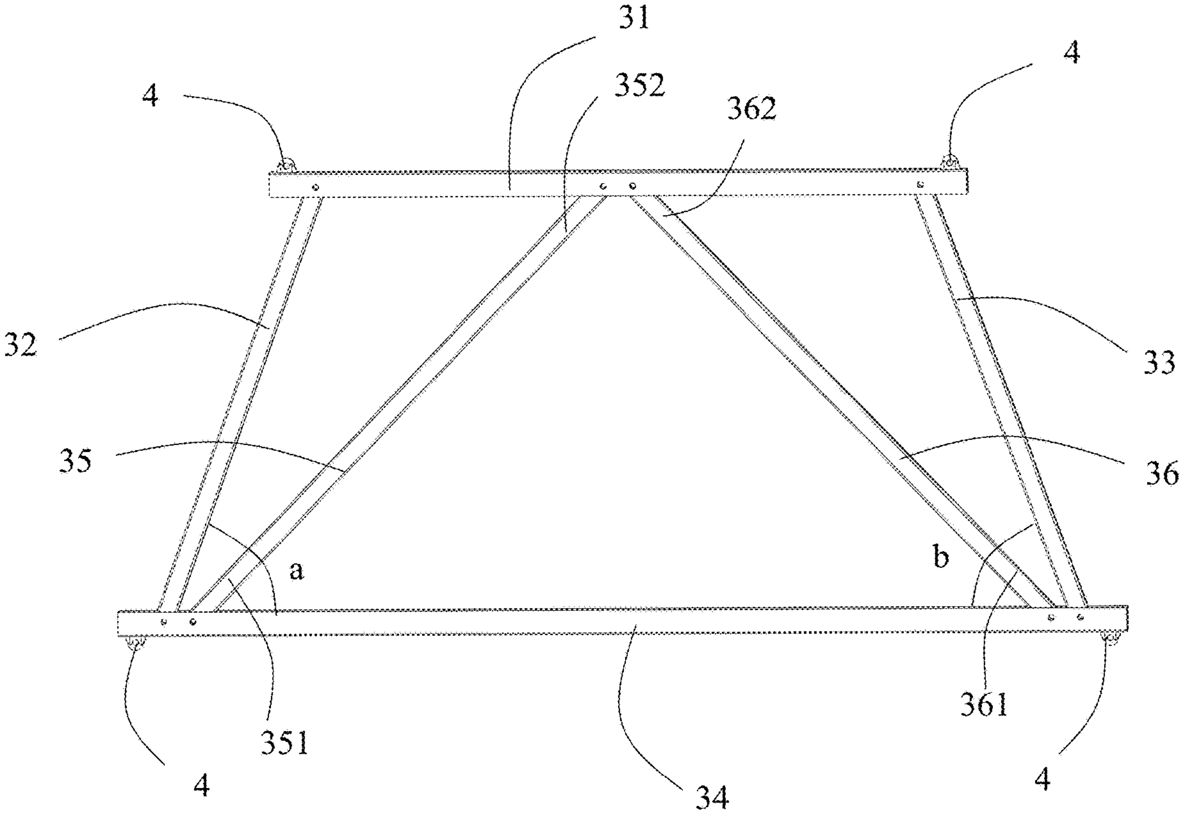
FIG. 4 is a front view of the support frame of the present disclosure.
Figure 5:
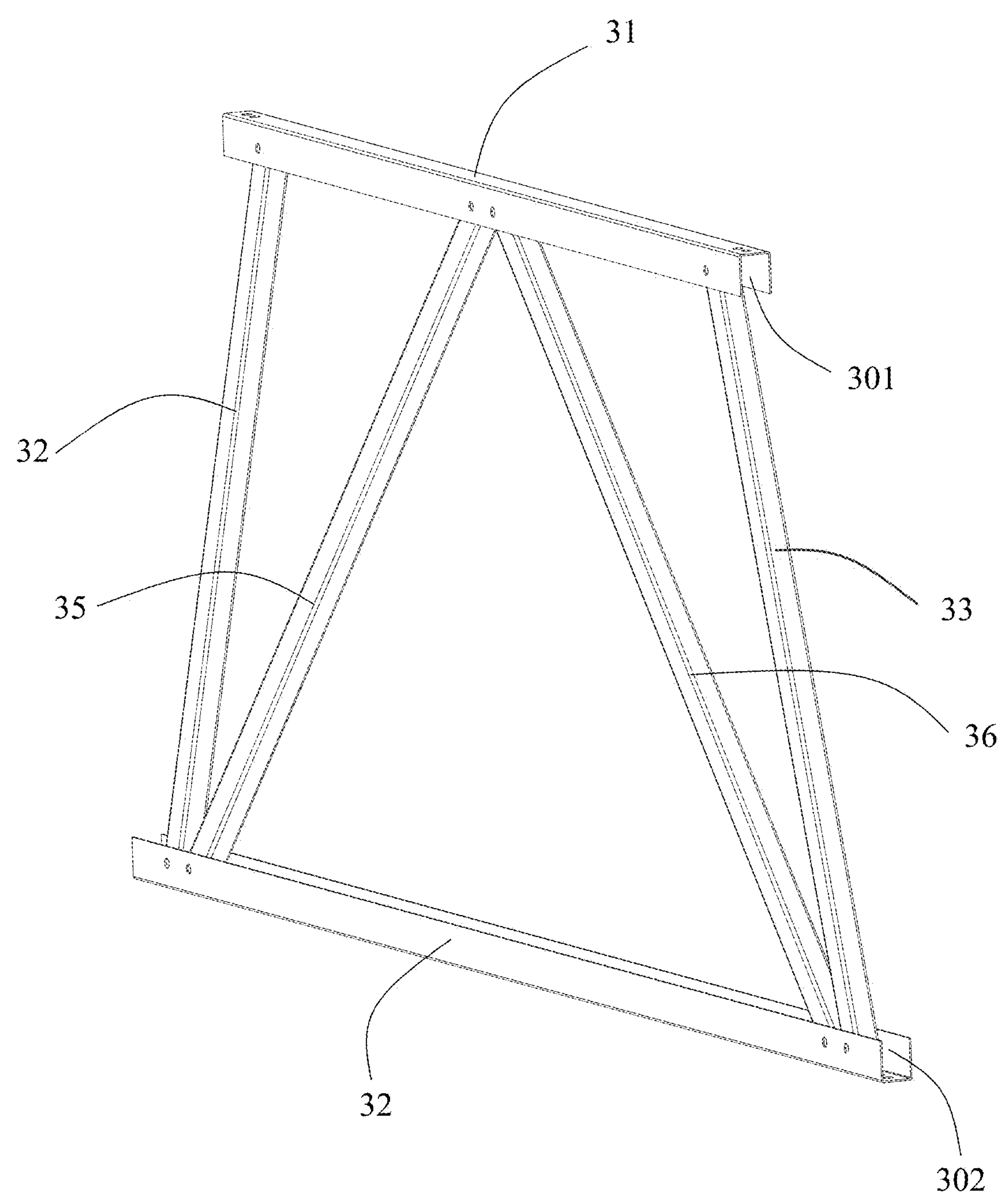
FIG. 5 is a perspective view of FIG. 4 from another angle.

Referring to FIG. 3 to FIG. 5, an included angle between the first side support rod 32 and the stabilizing rope support rod 34 is within 30 degrees to 90 degrees, and/or an included angle between the second side support rod 33 and the stabilizing rope support rod 34 is within 30 degrees to 90 degrees. When the included angle is less than 30 degrees, the slenderness ratio is large, the material consumption is large, and the cost is high. When the included angle is greater than 90 degrees, when the photovoltaic modules 300 rotates and forms a large inclination angle with the ground, the support frame 3 cannot overcome the overturning moment caused by gravity eccentricity. Preferably, the included angle between the first side support rod 32 and the stabilizing rope support rod 34 is 45 degrees, and/or the included angle between the second side support rod 33 and the stabilizing rope support rod 34 is 45 degrees. From this perspective, it can have the advantages of both cost and anti-torsion performance. The included angle between the first side support rod 32 and the stabilizing rope support rod 34 is a first included angle a. The included angle between the second side support rod 33 and the stabilizing rope support rod 34 is a second included angle b. In a first embodiment, the first included angle a and the second included angle b are both within 30 degrees to 90 degrees, and the first included angle a and the second included angle b are the same. Then, the first side support rod 32 and the second side support rod 33 extend obliquely to the outside along the top-to-bottom direction, and the support frame 3 has a trapezoidal structure. In a second embodiment, the first included angle a is within 30 degrees to 90 degrees. The first included angle a and the second included angle b are different. Then, the first side support rod 32 extends obliquely to the outside along the top-to-bottom direction, and the support frame 3 has a non-normal trapezoidal structure. In a third embodiment, the second included angle b is within 30 degrees to 90 degrees. The first included angle a and the second included angle b are different. Then, the second side support rod 33 extends to the outside along the top-to-bottom direction, and the support frame 3 has a non-normal trapezoidal structure. Such an arrangement can improve the overall structural strength of the support frame 3 so that the support frame 3 can support the photovoltaic modules 300. The present disclosure reduces the eccentric torque of the photovoltaic modules 300 caused by its own weight, thereby preventing the plane of the photovoltaic modules 300 from being twisted.

Referring to FIG. 4 and FIG. 5, the support frame 3 further includes a first support rod 35 and a second support rod 36. Two ends of the first support rod 35 are connected to the assembly rope support rod 31 and the stabilizing rope support rod 34, respectively. Two ends of the second support rod 36 are connected to the assembly rope support rod 31 and the stabilizing rope support rod 34, respectively. The first support rod 35, the second support rod 36 and the stabilizing rope support rod 34 (or the assembly rope support rod 31) form a triangle. The first support rod 35 includes a first end 351 and a second end 352 which is disposed oppositely to the first end 351. The second support rod 36 includes a third end 361 and a fourth end 362 which is disposed oppositely to the third end 361. In a first embodiment, the first end 351 is disposed adjacent to a connection between the first side support rod 32 and the stabilizing rope support rod 34. The second end 352 is disposed adjacent to a midpoint of the assembly rope support rod 31. The third end portion 361 is disposed adjacent to a connection between the second side support rod 33 and the stabilizing rope support rod 34. The fourth end 362 is disposed adjacent to the midpoint of the assembly rope support rod 31. In this way, the first support rod 35, the second support rod 36 and the stabilizing rope support rod 34 form a triangular structure, by which improves the overall structural strength of the support frame 3. In a second embodiment, the first end 351 is disposed adjacent to a connection between the first side support rod 32 and the assembly rope support rod 31. The second end 352 is disposed adjacent a midpoint of the stabilizing rope support rod 34. The third end portion 361 is disposed adjacent to a connection between the second side support rod 33 and the assembly rope support rod 31. The fourth end 362 is disposed adjacent to a midpoint of the stabilizing rope support rod 34. In this way, the first support rod 35, the second support rod 36 and the assembly rope support rod 31 form a triangular structure, by which improves the overall structural strength of the support frame 3.

Referring to FIG. 5, the assembly rope support rod 31 and the stabilizing rope support rod 34 are U-shaped steel. An opening of the assembly rope support rod 31 and an opening of the stabilizing rope support rod 34 are opposite to each other. Two ends of the first side support rod 32 and two ends of the second side support rod 33 are respectively inserted through an opening of the U-shaped steel and connected through fasteners. Preferably, the assembly rope support rod 31 and the stabilizing rope support rod 34 are arranged parallel to each other. The assembly rope support rod 31 extends along the width direction D2-D2 of the rope structure 2. The width direction D2-D2 and the length direction D1-D1 are perpendicular to each other. The assembly rope support rod 31 includes a first top wall 311 and two first side walls 312. The first top wall 311 extends along the width direction D2-D2. The two first side walls 312 extend vertically downward from two ends of the first top wall 311. The two first side walls 312 and the first top wall 311 form a first opening 301. The stabilizing rope support rod 34 includes a first bottom wall 341 and two second side walls 342. The first bottom wall 341 extends along the width direction D2-D2 of the rope structure 2. The two second side walls 342 extend vertically upward from two ends of the first bottom wall 341. The two second side walls 342 and the first bottom wall 341 form a second opening 302. The first opening 301 is opposite to the second opening 302, so that the two ends of the first side support rod 32 and the two ends of the second side support rod 33 are respectively inserted into the first opening 301 and the second opening 302, and connected through fasteners, thereby improving the overall structural strength of the support frame 3.

Figure 6:
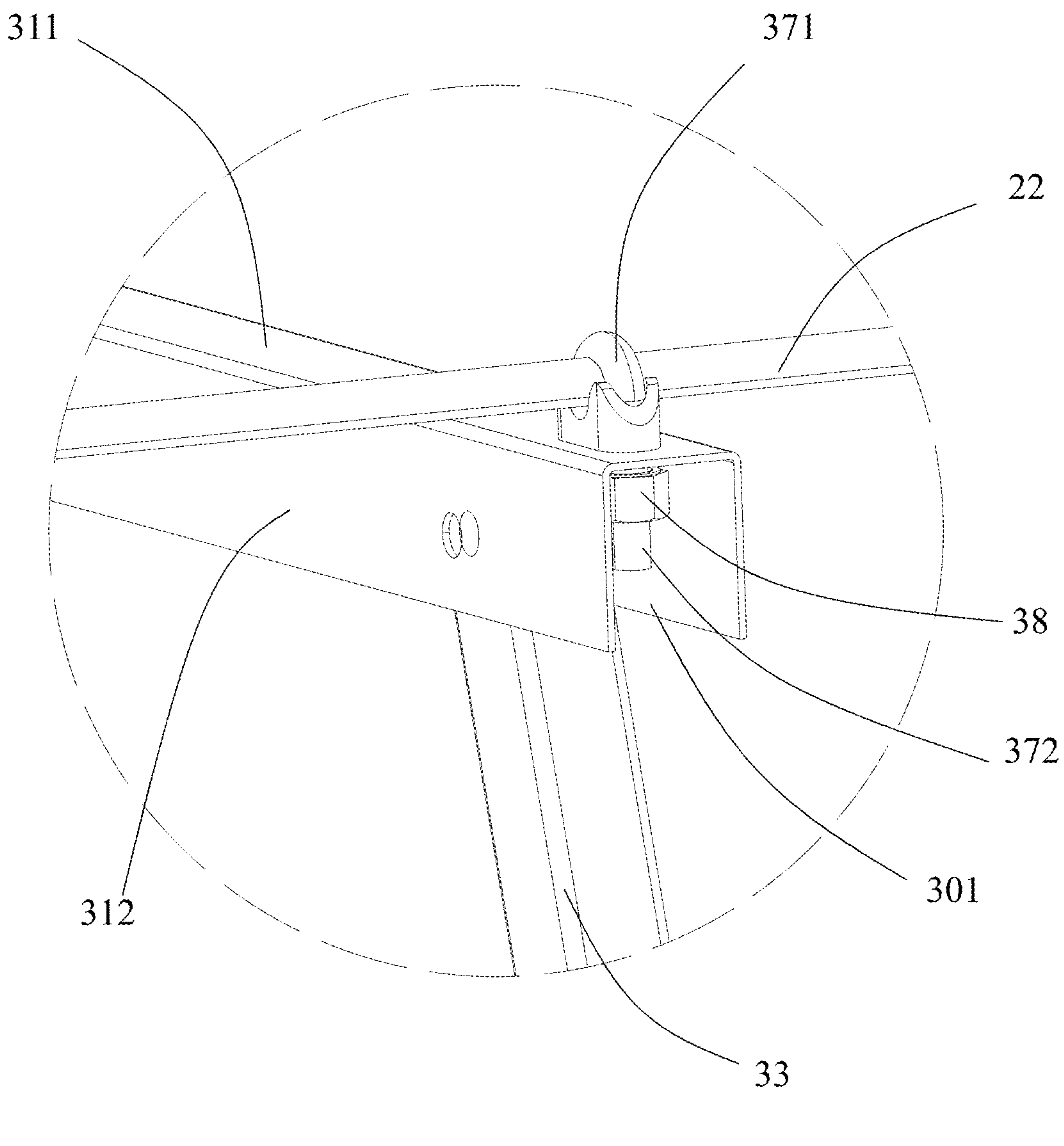
FIG. 6 is a partially enlarged schematic view of a second assembly rope, an assembly rope support rod and a connecting component in an assembled state of the present disclosure.
Figure 7:
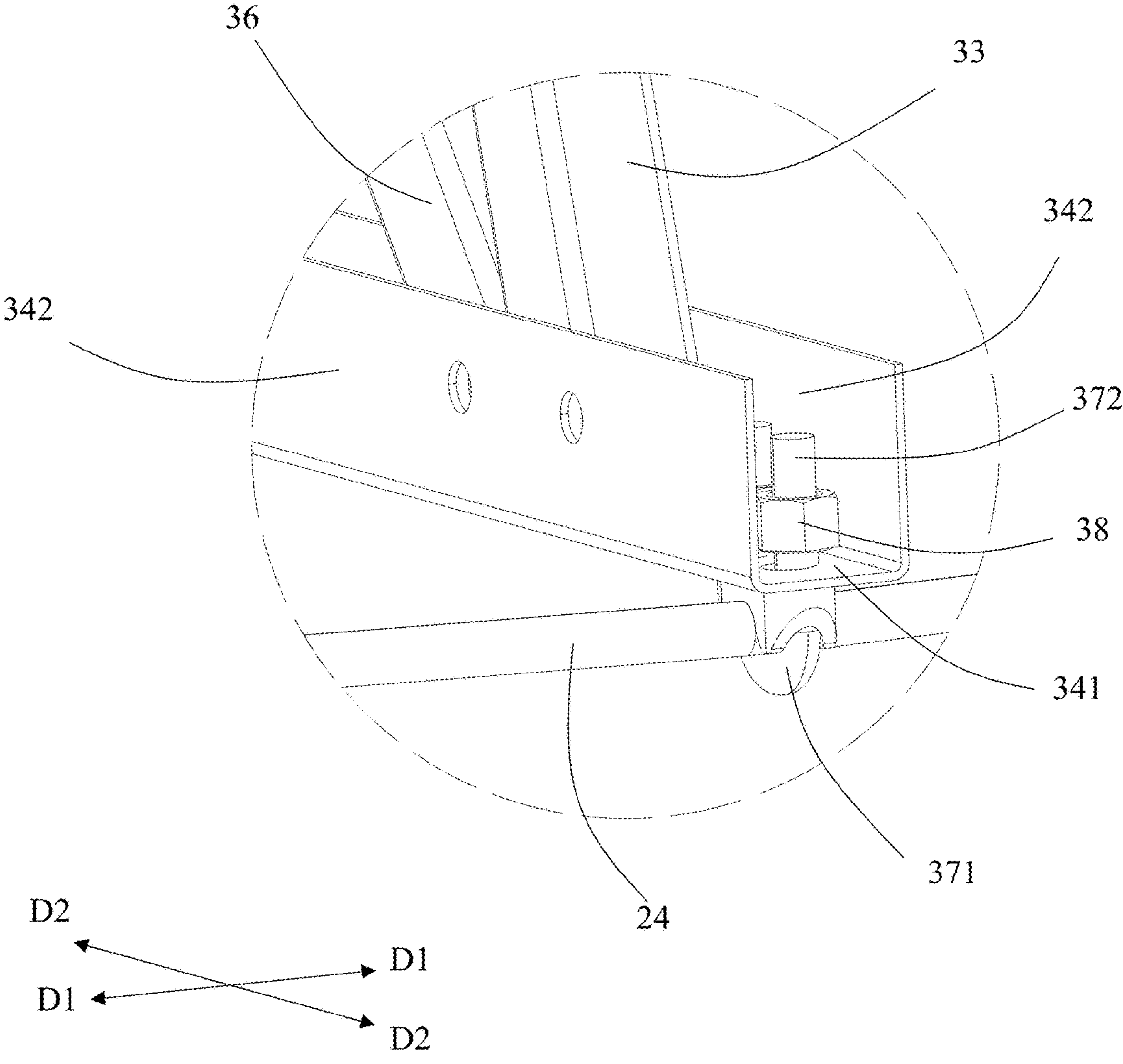
FIG. 7 is a partially enlarged schematic view of a second stabilizing rope, a stabilizing rope support rod and a connecting component in an assembled state of the present disclosure.
Figure 8:
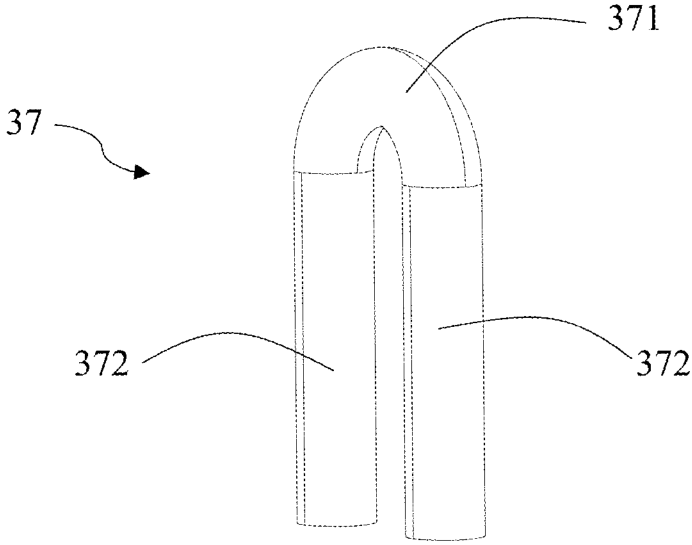
FIG. 8 is a perspective exploded schematic view of the connecting component and a pair of nuts of the present disclosure.
Figure 8:
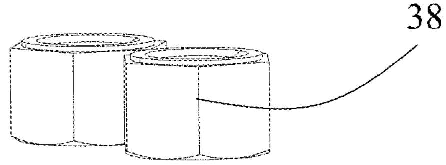

Referring to FIG. 6 to FIG. 8, the support frame 3 further includes a plurality of connecting components 37. The two ends of the assembly rope support rod 31 are respectively provided with the connecting components 37. The first assembly rope 21 and the second assembly rope 22 are connected to the assembly rope support rod 31 through the connecting components 37. The connecting component 37 is U-shaped. The connecting component 37 includes a U-shaped portion 371 and two free ends 372 provided at two ends of the U-shaped portion 371. The two free ends 372 pass through the first top wall 311 and are connected to the nuts 38. The first assembly rope 21 and the second assembly rope 22 pass through the U-shaped portion 371 respectively, so that the first assembly rope 21 and the second assembly rope 22 can be connected to the assembly rope support rod 31. The two ends of the stabilizing rope support rod 34 are respectively provided with the connecting components 37. The two free ends 372 of the connecting component 37 respectively pass through the first bottom wall 341 and are connected to the nuts 38. The first stabilizing rope 23 and the second stabilizing rope 24 pass through the U-shaped portion 371 respectively, so that the first stabilizing rope 23 and the second stabilizing rope 24 can be connected to the stabilizing rope support rod 34. As a result, the first assembly rope 21, the second assembly rope 22, the first stabilizing rope 23 and the second stabilizing rope 24 can rotate synchronously, which can drive the support frame 3 to rotate, thereby ensuring the plane flatness of the photovoltaic modules 300 during the rotation process.

Referring to FIG. 1, a plurality of support frames 3 are provided and arranged at intervals along the length direction D1-D1 of the rope structure 2. The plurality of support frames 3 include a first support frame 3001 located in a middle of the rope structure 2 and a plurality of second support frames 3002 located on two sides of the first support frame 3001 in the length direction D1-D1. An area of the first support frame 3001 is larger than an area of the second support frame 3002, so that the first stabilizing rope 23 and the second stabilizing rope 24 have an upward concave shape, thereby improving the wind resistance performance of the flexible photovoltaic system 100.

Figure 9:
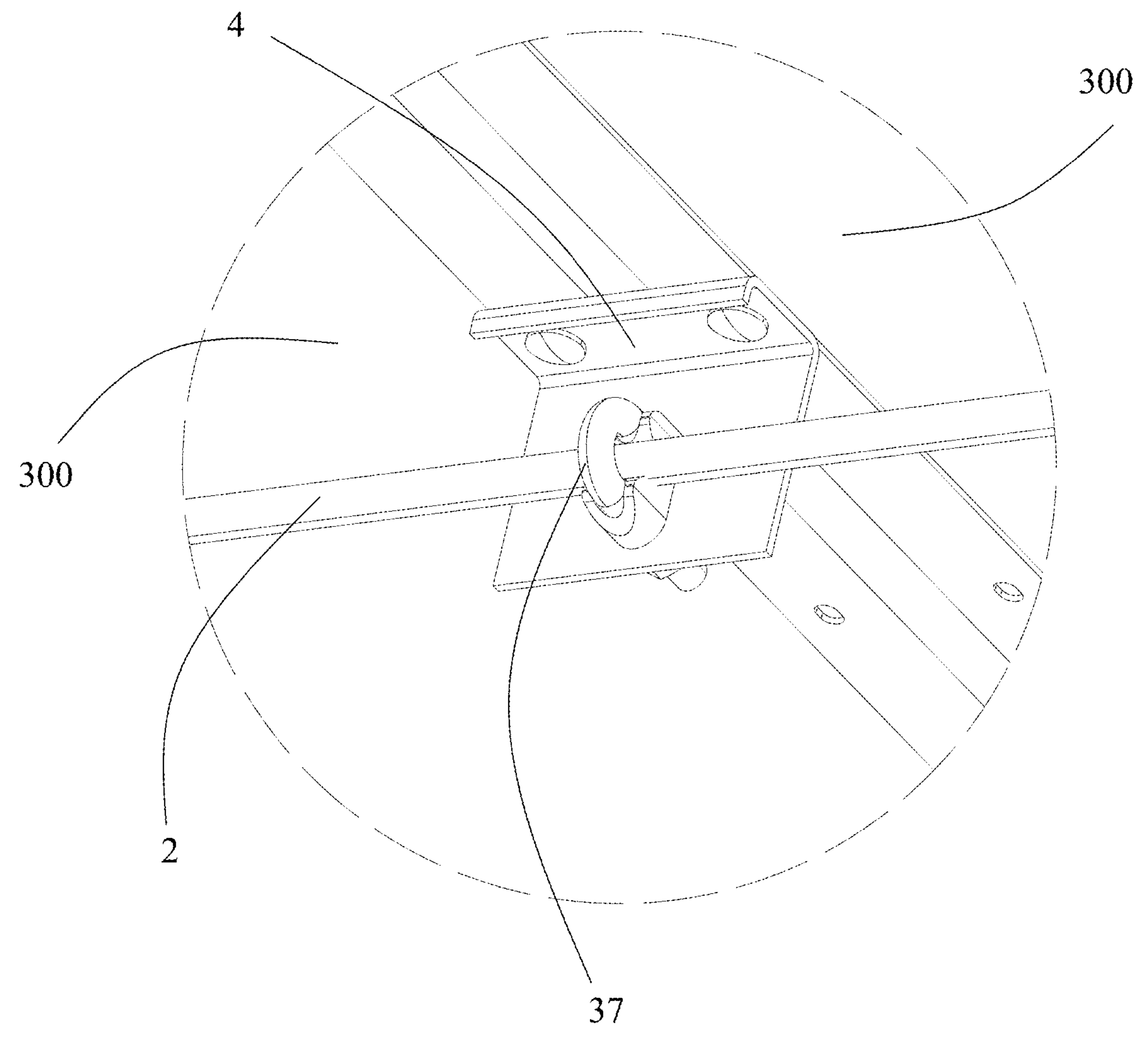
FIG. 9 is a perspective view of the photovoltaic module and a pressing block in an assembled state of the present disclosure.

Referring to FIG. 9, the photovoltaic modules 300 are fixedly connected to the first module rope 21 and the second module rope 22. The flexible photovoltaic bracket 200 further includes a plurality of pressing blocks 4. The pressing blocks 4 are arranged on an edge of the photovoltaic modules 300. The first assembly rope 21 and the second assembly rope 22 pass through the pressing blocks 4. The photovoltaic modules 300 are connected to the first module rope 21 and the second module rope 22 through the pressing blocks 4. Specifically, the plurality of pressing blocks 4 are symmetrically arranged on two sides of the photovoltaic modules 300 along an extension direction of the photovoltaic modules 300. The extension directions of the photovoltaic modules 300 are consistent with the length direction D1-D1 of the rope structure 2. One end of the pressing block 4 is connected to the photovoltaic module 300 through a fastener, and the other end of the pressing block 4 is provided with the connecting component 37. The first assembly rope 21 or the second assembly rope 22 is connected to the pressing block 4 through the connecting component 37, so that the photovoltaic modules 300 can be fixedly connected to the first assembly rope 21 and the second assembly rope 22. When the first assembly rope 21 and the second assembly rope 22 rotate, the photovoltaic modules 300 can be driven to rotate synchronously. The fixing parts of the photovoltaic modules 300 are well-known technologies, and there are no restrictions on the fixing parts of the photovoltaic modules 300, as long as the fixing connection between the photovoltaic modules 300 and the rope structure 2 can be achieved, no further details will be given here.

In summary, the present disclosure discloses the flexible photovoltaic bracket 200. The flexible photovoltaic bracket 200 includes the plurality of fixing structures 1, the rope structure 2 and the plurality of support frames 3. The rope structure 2 is connected to two fixing structures 1 which are disposed at intervals. The rope structure 2 includes the first assembly rope 21, the second assembly rope 22, the first stabilizing rope 23 and the second stabilizing rope 24. The first assembly rope 21 and the second assembly rope 22 are located above the first stabilizing rope 23 and the second stabilizing rope 24. The support frame 3 includes the assembly rope support rod 31, the first side support rod 32, the second side support rod 33 and the stabilizing rope support rod 34. The assembly rope support rod 31 is connected to the first assembly rope 21 and the second assembly rope 22. The first side support rod 32 is connected to the first assembly rope 21 and the first stabilizing rope 23. The second side support rod 33 is connected to the second assembly rope 22 and the second stabilizing rope 24. The stabilizing rope support rod 34 is connected to the first stabilizing rope 23 and the second stabilizing rope 24. The length of the assembly rope support rod 31 is shorter than the length of the stabilizing rope support rod 34. The first side support rod 32 and/or the second side support rod 33 extend obliquely to the outside along the top-to-bottom direction. When the inclination angle of the photovoltaic modules 300 installed on the rope structure 2 is too large, the first side support rod 32 and/or the second side support rod 33 can support the rope structure 2 and the photovoltaic modules 300. The lower edge of the photovoltaic modules 300 will not sag in an arc and will not easily cause the module to twist, thereby improving the stability of the structure of the flexible photovoltaic bracket 200.

The above embodiments are only used to illustrate the present disclosure and do not limit the technical solutions described in the present disclosure. The understanding of this description should be based on those skilled in the art, such as the description of directions such as "front", "back", "left", "right", "top" and "bottom", although the present disclosure has been described in detail with reference to the above-mentioned embodiments, those skilled in the art should understand that those skilled in the art can still make modifications or equivalent substitutions to the present disclosure. All technical solutions and improvements that do not deviate from the spirit and scope of the present disclosure shall be covered by the claims of the present disclosure.

What is claimed is:

1. A flexible photovoltaic bracket, comprising:

a plurality of fixing structures;

a rope structure connected between two fixing structures which are disposed at intervals; the rope structure comprising a first assembly rope, a second assembly rope, a first stabilizing rope and a second stabilizing rope; the first assembly rope and the second assembly rope being located above the first stabilizing rope and the second stabilizing rope;

a support frame comprising an assembly rope support rod, a first side support rod, a second side support rod and a stabilizing rope support rod; two ends of the assembly rope support rod being connected to the first assembly rope and the second assembly rope; two ends of the first side support rod being fixed to the assembly rope support rod and the stabilizing rope support rod, respectively; the first side support rod being attached to the first assembly rope and the first stabilizing rope through the assembly rope support rod and the stabilizing rope support rod; two ends of the second side support rod being fixed to the assembly rope support rod and the stabilizing rope support rod, respectively; the second side support rod being attached to the second assembly rope and the second stabilizing rope through the assembly rope support rod and the stabilizing rope support rod; two ends of the stabilizing rope support rod being connected to the first stabilizing rope and the second stabilizing rope; the assembly rope support rod, the first side support rod, the second side support rod and the stabilizing rope support rod being enclosed to form a frame with a closed trapezoidal configuration; a length of the assembly rope support rod being shorter than a length of the stabilizing rope support rod; the first side support rod and/or the second side support rod extend obliquely to an outside along a top-to-bottom direction.

2. The flexible photovoltaic bracket according to claim 1, wherein the support frame is symmetrical with respect to a center vertical line of the assembly rope support rod.

3. The flexible photovoltaic bracket according to claim 1, wherein an angle between the first side support rod and the stabilizing rope support rod is within 30 degrees to 90 degrees; and/or an angle between the second side support rod and the stabilizing rope support rod is within 30 degrees to 90 degrees.

4. The flexible photovoltaic bracket according to claim 1, wherein the support frame further comprises a first internal support rod and a second support internal rod; two ends of the first internal support rod are connected to the assembly rope support rod and the stabilizing rope support rod, respectively; two ends of the second internal support rod are connected to the assembly rope support rod and the stabilizing rope support rod, respectively; the first internal support rod, the second internal support rod and the stabilizing rope support rod form a triangle, or, the first internal support rod, the second internal support rod and the assembly rope support rod form a triangle.

5. The flexible photovoltaic bracket according to claim 1, wherein the assembly rope support rod, the first side support rod, the second side support rod and the stabilizing rope support rod are located on a same plane.

6. The flexible photovoltaic bracket according to claim 5, wherein the assembly rope support rod and the stabilizing rope support rod are U-shaped steel; an opening of the assembly rope support rod and an opening of the stabilizing rope support rod are opposite to each other; two ends of the first side support rod and two ends of the second side support rod are respectively inserted into an opening of the U-shaped steel and connected through fasteners.

7. The flexible photovoltaic bracket according to claim 1, wherein the support frame further comprises a plurality of connecting components, and the two ends of the assembly rope support rod are respectively provided with the connecting components;

wherein the first assembly rope and the second assembly rope pass through the connecting components and are connected to the assembly rope support rod; and/or, the two ends of the stabilizing rope support rod are respectively provided with the connecting components, the first stabilizing rope and the second stabilizing rope pass through the connecting components and are connected to the stabilizing rope support rod.

8. The flexible photovoltaic bracket according to claim 1, wherein a plurality of the support frames are provided and disposed at intervals along a length direction of the rope structure; the plurality of support frames comprise a first support frame located in a middle of the rope structure and a plurality of second support frames provided on two sides of the first support frame along the length direction; an area of the first support frame is larger than an area of the second support frame.

9. A flexible photovoltaic system, comprising:

a flexible photovoltaic bracket comprising:

a plurality of fixing structures;

a rope structure connected between two fixing structures which are disposed at intervals; the rope structure comprising a first assembly rope, a second assembly rope, a first stabilizing rope and a second stabilizing rope; the first assembly rope and the second assembly rope being located above the first stabilizing rope and the second stabilizing rope;

a support frame comprising an assembly rope support rod, a first side support rod, a second side support rod and a stabilizing rope support rod; two ends of the assembly rope support rod being connected to the first assembly rope and the second assembly rope; two ends of the first side support rod being fixed to the assembly rope support rod and the stabilizing rope support rod, respectively; the first side support rod being attached to the first assembly rope and the first stabilizing rope through the assembly rope support rod and the stabilizing rope support rod; two ends of the second side support rod being fixed to the assembly rope support rod and the stabilizing rope support rod, respectively; the second side support rod being attached to the second assembly rope and the second stabilizing rope through the assembly rope support rod and the stabilizing rope support rod; two ends of the stabilizing rope support rod being connected to the first stabilizing rope and the second stabilizing rope; the assembly rope support rod, the first side support rod, the second side support rod and the stabilizing rope support rod being enclosed to form a frame with a closed trapezoidal configuration; a length of the assembly rope support rod being shorter than a length of the stabilizing rope support rod; the first side support rod and/or the second side support rod extend obliquely to an outside along a top-to-bottom direction; and a plurality of photovoltaic modules installed on the flexible photovoltaic bracket; the photovoltaic modules being fixedly connected to the first assembly rope and the second assembly rope.

10. The flexible photovoltaic system according to claim 9, wherein the flexible photovoltaic bracket further comprises a plurality of pressing blocks which are arranged on an edge of the photovoltaic modules; the first assembly rope and the second assembly rope pass through the pressing blocks; the photovoltaic modules are connected to the first assembly rope and the second assembly rope through the pressing blocks.

11. The flexible photovoltaic system according to claim 9, wherein the support frame is symmetrical with respect to a center vertical line of the assembly rope support rod.

12. The flexible photovoltaic system according to claim 9, wherein an angle between the first side support rod and the stabilizing rope support rod is within 30 degrees to 90 degrees; and/or an angle between the second side support rod and the stabilizing rope support rod is within 30 degrees to 90 degrees.

13. The flexible photovoltaic system according to claim 9, wherein the support frame further comprises a first internal support rod and a second internal support rod; two ends of the first internal support rod are connected to the assembly rope support rod and the stabilizing rope support rod, respectively; two ends of the second internal support rod are connected to the assembly rope support rod and the stabilizing rope support rod, respectively; the first internal support rod, the second internal support rod and the stabilizing rope support rod form a triangle, or, the first internal support rod, the second internal support rod and the assembly rope support rod form a triangle.

14. The flexible photovoltaic system according to claim 9, wherein the assembly rope support rod, the first side support rod, the second side support rod and the stabilizing rope support rod are located on a same plane.

15. The flexible photovoltaic system according to claim 14, wherein the assembly rope support rod and the stabilizing rope support rod are U-shaped steel; an opening of the assembly rope support rod and an opening of the stabilizing rope support rod are opposite to each other; two ends of the first side support rod and two ends of the second side support rod are respectively inserted into an opening of the U-shaped steel and connected through fasteners.

16. The flexible photovoltaic system according to claim 9, wherein the support frame further comprises a plurality of connecting components, and the two ends of the assembly rope support rod are respectively provided with the connecting components;

wherein the first assembly rope and the second assembly rope pass through the connecting components and are connected to the assembly rope support rod; and/or, the two ends of the stabilizing rope support rod are respectively provided with the connecting components, the first stabilizing rope and the second stabilizing rope pass through the connecting components and are connected to the stabilizing rope support rod.

17. The flexible photovoltaic system according to claim 9, wherein a plurality of the support frames are provided and disposed at intervals along a length direction of the rope structure; the plurality of support frames comprise a first support frame located in a middle of the rope structure and a plurality of second support frames provided on two sides of the first support frame along the length direction; an area of the first support frame is larger than an area of the second support frame.

* * * * *